United States Patent [19]
Haas

[11] 3,806,230
[45] Apr. 23, 1974

[54] LIQUID CRYSTAL IMAGING SYSTEM HAVING OPTICAL STORAGE CAPABILITIES

[75] Inventor: Werner E. L. Haas, Webster, N.Y.

[73] Assignee: Xerox Corporation, Stamford, Conn.

[22] Filed: Dec. 14, 1971

[21] Appl. No.: 207,787

[52] U.S. Cl............................ 350/160 LC, 252/408
[51] Int. Cl................................................. G02f 1/16
[58] Field of Search............................... 350/160 LC

[56] References Cited
UNITED STATES PATENTS
| | | | |
|---|---|---|---|
| 3,703,331 | 11/1972 | Goldmacher et al. | 350/160 LC |
| 3,642,348 | 2/1972 | Wysacki et al. | 350/160 LC |
| 3,680,950 | 8/1972 | Haas et al. | 350/150 |

OTHER PUBLICATIONS
Buckingham et al.: Chem. Phys. Lett., Vol. 3, No. 7, pp. 540t. 1969.

*Primary Examiner*—Edward S. Bauer
*Attorney, Agent, or Firm*—James J. Ralabate; David C. Petre; Gaetano D. Maccarone

[57] ABSTRACT

Liquid crystalline compositions possessing the optical properties of the cholesteric liquid crystalline mesophase and comprising a nematic liquid crystalline material and at least one optically active non-mesomorphic material have optical storage capabilities when utilized in an imaging process wherein an electrical field is applied across a layer of the composition. An image formed in this manner is retained when the electric field or current is removed from the liquid crystalline imaging layer. Typically the image is scattering, contrasting with the clear unaffected region not subjected to the electrical field, and can be erased with high frequency A.C. fields.

25 Claims, 5 Drawing Figures

PATENTED APR 23 1974

INVENTOR.
WERNER E.L. HAAS
BY J. D. Maccarone
ATTORNEY

LIQUID CRYSTAL IMAGING SYSTEM HAVING OPTICAL STORAGE CAPABILITIES

BACKGROUND OF THE INVENTION

This invention relates generally to an imaging system and more particularly to an imaging system utilizing liquid crystalline compositions possessing the optical properties of the cholesteric liquid crystalline mesophase which have optical storage capabilities when used in accordance with the invention.

Liquid crystalline substances exhibit physical characteristics some of which are typically associated with liquids and others which are typically unique to solid crystals. The name "liquid crystals" has become generic to substances exhibiting these dual properties. Liquid crystals are known to appear in three different forms: the smectic, nematic and cholesteric forms. These structural forms are sometimes referred to as mesophases thereby indicating that they are states of matter intermediate between the liquid and crystalline states. The three mesophase forms of liquid crystals mentioned above are characterized by different physical structures wherein the molecules of the compound are arranged in a manner which is unique to each of the three mesomorphic structures. Each of these three structures is well known in the liquid crystal art.

Some liquid crystalline substances possess optically negative characteristics. Birefringence, also referred to as double refraction, is an optical phenomenon characteristic of some solid crystals and most liquid crystal substances. When a beam of unpolarized light strikes a birefringent substance it is split into two polarized components whose transverse vibrations are at right angles to each other. The two components are transmitted at different velocities through the substance and emerge as beams of polarized light. By the term "optically negative liquid crystalline substances", as used herein, it is meant those for which the extraordinary index of refraction $\nu_E$ is smaller than the ordinary index of refraction $\nu_O$. Cholesteric liquid crystal substances exhibit this property. For a detailed description of this phenomenon see *Optical Crystallography*, Wahlstrom, 4th Edition, Wiley and Sons, Inc., New York.

The molecules in cholesteric liquid crystals are arranged in very thin layers with the long axes of the molecules parallel to each other and to the plane of the layers within each layer. Because of the asymmetry and steric nature of the molecules the direction of the long axes of the molecules in each layer is displaced slightly from the corresponding direction in adjacent layers. This displacement is cumulative over successive layers so that overall displacement traces out a helical path. A comprehensive description of the structure of cholesteric liquid crystals is given in *Molecular Structure and the Properties of Liquid Crystals*, G.W. Gray, Academic Press, 1962.

Cholesteric liquid crystals have the property that when the propagation direction of plane polarized or unpolarized light is along the helical axis thereof, i.e., when the light enters in a direction perpendicular to the long axes of the molecules, (neglecting absorption considerations), this light is essentially unaffected in transmission through thin films of such liquid crystals except for a wavelength band centered about some wavelength $\lambda_o$ where $\lambda_o = 2np$ with $n$ representing the index of refraction of the liquid crystal substance and $p$ the pitch or repetition distance of the helical structure. The bandwidth $\Delta\lambda_o$ of this wavelength band centered about $\lambda_o$ will typically be of the order of about $\lambda_o/14$. For light of a wavelength $\lambda_o$, the cholesteric liquid crystal, under these conditions, exhibits selective reflection of the light such that approximately 50 percent of the light is reflected and approximately 50 percent is transmitted, assuming negligible absorption which is usually the case, with both the reflected and transmitted beams being approximately circularly polarized in opposite directions.

Because of these optical properties optically negative liquid crystalline substances have been found to be highly advantageous for use in many various applications such as, for example, imaging systems, optical filters and detection systems for detecting the presence of, or changes in the presence of, various stimuli such as pressure, temperature, chemical vapors. Moreover since these materials can be advantageously employed in such a wide variety of potentially very useful applications a great deal of investigation has been directed to the study of the cholesteric liquid crystalline mesophase.

Thus it has been disclosed in the art that the addition of small amounts e.g. about 10 percent by weight or less, of optically active, non-mesomorphic materials such as l-menthol and tartaric acid to nematic liquid crystalline materials will provide compositions having the optical properties of the cholesteric liquid crystalline mesophase. See A.D. Buckingham et al., Chem. Phys. Letters, 3, No. 7, 540 (1969).

Specifically, with respect to the use of liquid crystalline materials in imaging systems, investigation has been made into the optical memory effects of the materials since, as will be clearly apparent to those skilled in the art, the capability for providing an image which can be retained for relatively long periods of time after the image-providing force has been removed from the material adds another dimension to the imaging system. Copending patent application Ser. No. 867,593, filed Oct. 20, 1969 now U.S. Pat. No. 3,642,348 discloses that cholesteric liquid crystalline materials possess memory effects when utilized in an imaging system wherein an electrical field is used to provide images on cholesteric liquid crystalline films. That mixtures of cholesteric liquid crystalline materials and nematic liquid crystalline materials possess memory effects when utilized in an imaging mode has been disclosed by Heilmeier and Goldmacher in App. Phys. Letters, 13, 132 (1968). Additionally French Pat. No. 1.598.439 discloses that compositions having memory effects can be formed by combining nematic liquid crystalline materials with cholesterol, cholesterol derivatives or cholesteric liquid crystals.

Nevertheless, even in view of this body of art, the memory effect phenomenon has not been fully understood. That this is the case is evidenced by the fact that various theoretical explanations for the occurrence of this phenomenon have been advanced. For example, the literature report referred to above (App. Phys. Letters, 13, 132, 1969) postulates that the memory effects possessed by cholesteric-nematic mixtures occur as a result of the emulsification of the nematic component.

In growing areas of technology, such as liquid crystals, new methods, apparatus, compositions and articles are often discovered for the application of the new technology in a new mode. The present invention relates to a novel and advantageous imaging system utilizing liquid crystalline compositions possessing the optical properties of the cholesteric liquid crystalline mesophase and which also possess memory effects when utilized in the system of the invention.

SUMMARY OF THE INVENTION

It is, therefore, an object of this invention to provide a novel imaging system.

It is another object of the invention to provide a novel liquid crystalline imaging system.

It is a further object of the invention to provide a liquid crystalline imaging system utilizing liquid crystalline compositions having the optical properties of the cholesteric liquid crystalline mesophase.

It is still another object of the invention to provide such a liquid crystalline imaging system utilizing compositions comprising nematic liquid crystalline material and optically active, non-mesomorphic material.

It is a still further object of the invention to provide a liquid crystalline imaging system which has optical storage capability.

These and other objects and advantages of the invention are accomplished by providing liquid crystalline compositions having the optical properties of the cholesteric liquid crystalline mesophase and comprising at least one nematic liquid crystalline material and at least one optically active, non-mesomorphic material. These liquid crystalline compositions are utilized in an imaging system according to the invention, generally speaking, by applying an electric field across a relatively thin film of the imaging composition. When the field is applied light scattering is observed in the field-affected areas. The imaging compositions possess a memory capability whereby this light scattering effect persists after the electrical force is removed from the liquid crystalline film. According to a preferred embodiment of the invention the electrical field may be applied across the liquid crystalline film in imagewise fashion whereby the image is formed immediately on the film. Alternatively a uniform electrical field may be applied across the liquid crystalline film whereby the entire film becomes light-scattering and subsequently the film may be "erased" in imagewise fashion to provide a visible image as will be described in detail further below.

It should be understood that by the terms "memory effect" or "memory capability" as used throughout the specification and in the claims is meant the phenomenon whereby a film of a liquid crystalline material possessing the optical properties of the cholesteric liquid crystalline mesophase remains in substantially the texture state in which it exists during the time electrical field is applied thereacross after the electrical field is removed therefrom.

The novel imaging system of the invention advantageously provides a permanent image which can be utilized in a number of different ways as, for example, providing the optical image input for a xerographic reproduction system or to expose a photographic medium thereby leading to the formation of a hard copy reproduction of the image.

The invention will be more fully understood from the following detailed description of various preferred embodiments thereof particularly when read in conjunction with the accompanying drawings wherein.

Figure 1:
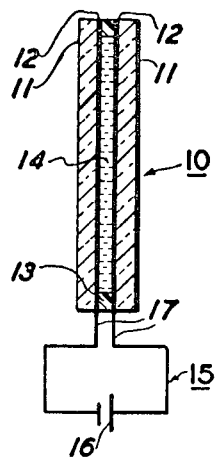
FIG. 1 is a partially schematic cross-sectional view of a liquid crystalline imaging member.

FIG. 1 illustrates a typical liquid crystalline electrooptic imaging cell. In FIG. 1 a typical liquid crystalline imaging member 10, sometimes referred to as an electroded imaging sandwich, is shown in cross-section wherein a pair of transparent plates 11 having substantially transparent conductive coating 12 upon the contact surface, comprise a pair of parallel substantially transparent electrodes. An imaging member wherein both electrodes is preferred where the imaging member is to be viewed using transmitted light; however a liquid crystalline imaging member may also be viewed using reflected light thereby requiring only a single transparent electrode while the other may be opaque. The transparent electrodes are separated by spacing member 13 which contains voids which form one or more shallow cups which contain the liquid crystalline film or layer which comprises the active element of the imaging member. A field is created between the electrodes by external circuit 15 which typically comprises a source of potential 16 which is connected across the two electrodes through leads 17. The potential source may be either D.C., A.C. or combinations thereof.

In the advantageous system of the present invention the mechanism by which images are formed in the liquid crystalline film or layer is a Grandjean to focal-conic texture transformation. A system for transforming a cholesteric, or optically negative liquid crystalline substance, from its Grandjean, or "disturbed", texture state to its focal-conic, or "undisturbed" texture state by an applied electric field is described and claimed in copending application Ser. No. 867,593 filed Oct. 20, 1969 now U.S. Pat. No. 3,642,348, the entire disclosure of which is hereby incorporated by reference herein.

When a cholesteric liquid crystalline material is in the Grandjean texture state, if the $\lambda_o$ value of the material is in the visible spectrum, a film or layer thereof appears to have the color corresponding to $\lambda_o$ and, if $\lambda_o$ is outside the visible spectrum the film appears colorless and non-scattering. When a cholesteric liquid is in its focal-conic texture state its appearance is typically milky-white. Thus when the imaging compositions utilized in the present invention are placed in the unbiased electrode sandwich in their Grandjean texture state they typically initially appear colored, or colorless and transparent. If the electrode sandwich is observed between polarizers the imaging sandwich appears colored or black. When an electrical field in the texture transformation electrical field strength range of the imaging composition is placed across the liquid crystalline film, the induced texture change is observed because the liquid crystalline film becomes white in the imaged areas when the imaging sandwich is observed in transmitted or reflected light. Hence, the imaging process typically produces a white image on a transparent, dark or colored background. Any other suitable means for enhancing the contrast of the imaged areas may also be employed in place of the polarizers. Further, it is clear that either field-affected or non field-affected areas in the liquid crystalline imaging sandwich may be used to create the desired image, with or without the use of polarizers or other image enhancing devices.

In the liquid crystal imaging members described in FIG. 1 the electrodes may be of any suitable transparent, conductive material. Typical suitable transparent, conductive electrodes include glass or plastic substrates having substantially transparent and continuously conductive coatings of conductors such as tin, indium oxide, aluminum, chromium, tin oxide or any other suitable conductor. These substantially transparent, conductive coatings are typically evaporated onto the more insulating, transparent substrate. NESA glass, a tin oxide coated glass manufactured by the Pittsburgh Plate Glass Company, is a commercially available example of a typical transparent, conductive electrode material.

The spacer, 13 in FIG. 1, which separates the transparent electrodes and contains the liquid crystal film between the electrodes, is typically chemically inert, transparent, preferably not birefringent, substantially insulating and has appropriate dielectric characteristics. Materials suitable for use as insulating spacers include cellulose acetate, cellulose triacetate, cellulose acetate butyrate, polyurethane elastomers, polyethylene, polypropylene, polyesters, polystyrene, polycarbonates, polyvinylfluoride, polytetrafluoroethylene, polyethylene terephthalate and mixtures thereof.

The liquid crystal imaging film 14 may comprise any suitable liquid crystalline composition possessing the optical properties of the cholesteric liquid crystalline mesophase and comprising at least one nematic liquid crystalline substance and at least one optically active, non-mesomorphic material. The imaging compositions typically comprise from about 2 to about 60 percent by weight of the optically active, non-mesomorphic component; however the amounts of the respective components present in any imaging composition suitable for use according to the invention are controlled only by the requirement that the imaging composition should possess the optical properties of the cholesteric liquid crystalline mesophase. Additionally the non-mesomorphic component of the imaging composition should be substantially completely soluble in the nematic liquid crystalline component.

Typical suitable nematic liquid crystalline materials include: p-azoxyanisole, p-ozoxyanisole, p-azoxyphenetole, p-butoxybenzoic acid, p-methoxycinnamic acid, butyl-p-anisylidene-p'-aminocinnamate, anisylideneparaaminophenylacetate, p-ethoxybenzylamino-a-methylcinnamic acid, 1,4-bis(p-ethoxybenzylidene) cyclohexanone, 4,4'-dihexyloxybenzene, 4,4'-diheptyloxybenzene, anisal-p-amino azobenzene, anisaldazine, a-benzeneazo-(anisal naphthylamine), anisylidene-p-n-butylaniline, n,n'-nonoxybenzyltoluidine, p-ethoxybenzylidene-p'-n-butylaniline and mixtures thereof. Preferred nematic liquid crystalline materials for use in the imaging compositions utilized according to the invention are disclosed in copending patent applications Ser. No. 179,731, filed Sept. 13, 1971 and Ser. No. 188,054, filed Oct. 12, 1971 are hereby incorporated by reference herein.

Any suitable optically active, non-mesomorphic material may be used in the imaging compositions formed according to the invention. These materials should be substantially completely soluble in the nematic liquid crystalline substances utilized in the imaging composition. Typical suitable optically active, non-mesomorphic materials include: derivatives of alcohols such as 1-menthol, 1-linanool, d-mannitol, d-borneol and d-quercitol; derivatives of ketones such as d-camphor, d-3-methylcyclohexanone, 1-methone and 1-6-isopropyl-3-cyclohexanone; derivatives of carboxylic acids such as d-citronellic acid, 1-citronellic acid, d-chaulmoogric acid, 1-campholic acid, 1-arabonic acid, d-tartaric acid and 1-ascorbic acid; derivatives of aldehydes such as d-citronellal; derivatives of alkenes such as 1-B.pinane, d-silvesterene, and d-limonene; derivatives of amines such as 1-2-methylpiperidine; derivatives of nitriles such as d-mandelonitrile; derivatives of amides such as d-hydrocarbamide; and mixtures thereof.

Mixtures of the nematic liquid crystalline substance and the optically active, non-mesomorphic material can be prepared in organic solvents such as chloroform, petroleum ether, methylethyl ketone and the like, which are typically subsequently evaporated from the mixture thereby leaving the liquid crystalline composition. Alternatively the individual components of the liquid crystalline composition can be combined directly by heating the mixed components to a temperature which is above the isotropic transition temperature of the nematic liquid crystalline substance and the melting point of the non-mesomorphic material.

In the advantageous system of the present invention it has now been surprisingly found that when a composition comprised of nematic liquid crystalline substance and optically active, non-mesomorphic material and having the optical properties of the cholesteric liquid crystalline mesophase is used in an electrode sandwich such as that described in FIG. 1, the electrical fields placed across the liquid crystal film cause light scattering to be observed and this light scattering phenomenon persists after the fields are removed. It is thought that the persistence of scattering in liquid crystal materials after the electrical field is removed and current flow ceases is due to the presence of a single cholesteric liquid crystalline mesophase predominantly in the focal-conic texture state, which is the light-scattering state.

The image which is retained on the liquid crystalline film according to the process of the invention may be utilized advantageously in a number of ways. For example the image may be used as the optical input in a xerographic reproduction process by projecting it onto an electrostatically charged photoconductive insulating plate in accordance with the well known xerographic reproduction process and a hard copy reproduction of the image mode. Since the image may persist for relatively long periods of time, for example, days any number of copies may be made from this "master" image. Similarly, a hard copy reproduction of the image retained on the liquid crystalline film may be made using photographic techniques.

Subsequently the image may conveniently be erased by mechanically shearing the liquid crystalline film or by electrical means by applying high frequency A.C. fields, for example above about 200 c.p.s., across the liquid crystalline film or by flooding the film with a D.C. field thereby rendering it immediately reusable for additional imaging cycles according to the invention.

Figure 2:
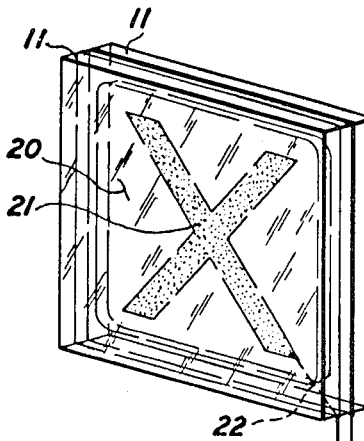
FIG. 2 is a partially schematic isometric view of an embodiment of a liquid crystalline imaging member wherein the desired image is defined by the shape of at least one of the electrodes.

FIG. 2 illustrates a preferred embodiment of the liquid crystal imaging member described in FIG. 1. In FIG. 2 the desired image is defined by the shape of an electrode, and therefore by the shape of the corresponding electrical field. The imaging member here comprises transparent plates 11 separated by spacer gasket 13 having void area 20 filled with liquid crystalline material, and comprising substantially the entire area of spacer 13. The desired image is defined by the shape of the substantially transparent conductive coating shown at 21, which is affixed to the inner surface of one or both of the transparent support plates 11, and is affixed only in the desired image configuration. The embodiment illustrated in FIG. 2 shows only one of the two electrodes in image configuration, however it will be understood by those skilled in the art that both electrodes could conveniently be made in a matched pair to define the same desired image. When the single image electrode configuration is used, the second electrode will comprise transparent plate 11 with substantially transparent conductive coating 12 upon the entire area of the inner surface of the transparent electrode. It is noted that a very thin, or substantially invisible conductor 22 is necessary to electrically connect the electrode in the desired image configuration to external circuit 15 which is similarly connected to the conductive coating of the opposite electrode. In operation this embodiment will produce an electric field only in areas where there are parallel electrodes, i.e. between the electrode in the desired image configuration and the opposite electrode, whether or not the second electrode is also in the desired image configuration. Again here, one of the electrodes may be opaque if it is desired to observe the imaged member by reflected light rather than by transmitted light.

Figure 3:
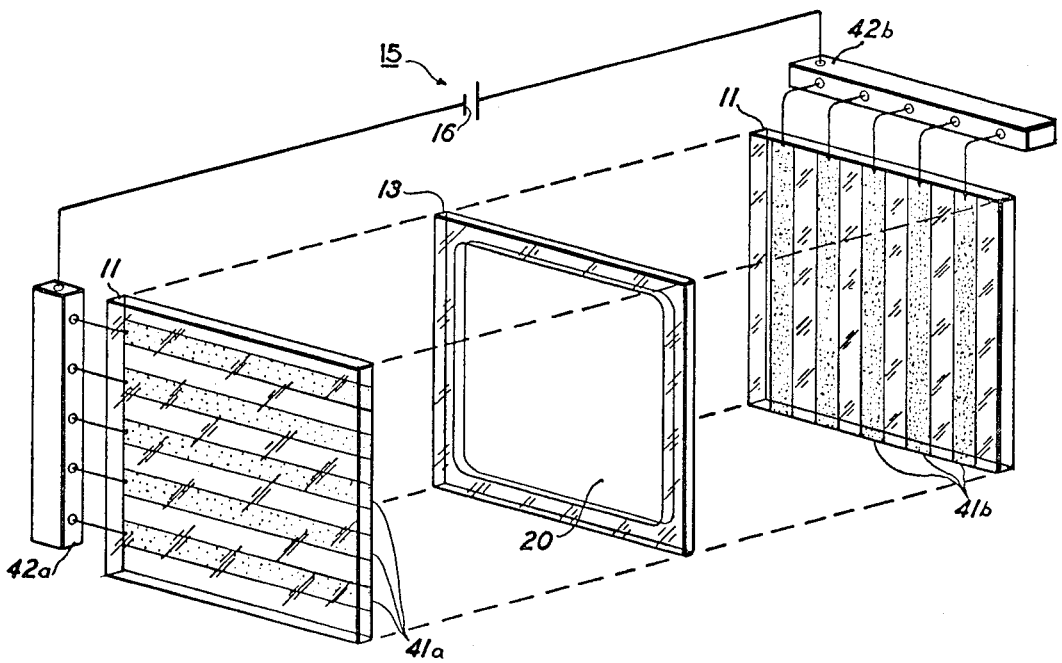
FIG. 3 is an exploded isometric view of an imaging system wherein a liquid crystalline imaging member is imaged by an X-Y address system.

In FIG. 3 an X-Y address system suitable for imaging a liquid crystalline imaging member is illustrated in exploded isometric view. The liquid crystalline imaging film is placed in void area 20 within the transparent and substantially insulating spacer-gasket 13. The liquid crystalline film and spacer 13 are sandwiched between a pair of substantially transparent electrodes comprising transparent support plates 11 upon which strips of substantially transparent, conductive material 41 are coated. The substantially transparent electrodes are oriented so that conductive strips 41b and conductive strips 41a on the respective electrodes cross each other in an X-Y matrix or grid. Each conductive strip in each set of parallel strips 41a and 41b is electrically connected to a circuit system 42 which is suitable for selective or sequential operation. Through selection system 42 and external circuit 15 including source of potential 16, an electrical field suitable for creating the Grandjean to focal-conic texture transformation can be created across selected points or a selected sequence of points in the illustrated imaging system. It will be understood that substantially transparent conductive strips 41 may vary in width from a very fine, wire-like structure to any desired strip width. In addition, one support plate 11 may be opaque where the imaging system is to be observed from one side using only reflected light.

In an alternative embodiment of the imaging system of the invention wherein the imaging member shown in FIG. 3 is used, the entire liquid crystal film may be transformed to its predominantly focal-conic state by applying thereacross an electrical field within the Grandjean to focal-conic texture transformation field strength range and subsequently selectively erasing the film, i.e. returning the liquid crystalline material to its predominantly Grandjean texture state in selective areas by applying suitable A.C. electric fields across the liquid crystal film at selected areas.

Figure 4:
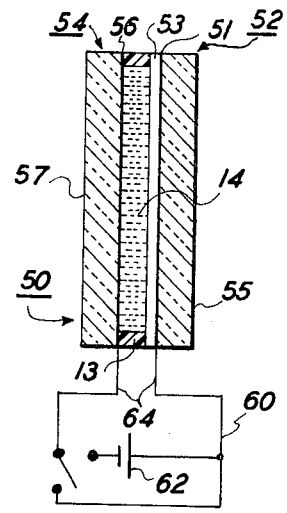
FIG. 4 is a partially schematic cross-sectional view of an embodiment of a liquid crystalline imaging member wherein at least one of the electrodes has a photoconductive surface.

FIG. 4 describes still another preferred embodiment of a liquid crystalline electro-optic imaging cell wherein one of the electrodes comprises a photoconductor and imaging is effected by applying a uniform potential across the entire area of the electrodes and subsequently exposing the photoconductor to an imagewise pattern of activating electromagnetic radiation corresponding to a desired image configuration. Referring now to FIG. 4 there is seen an electro-optic imaging cell, generally designated 50, where in a pair of plates, generally designated 52 and 54 respectively, comprise a parallel pair of electrodes at least one of which is substantially transparent. For purposes of illustration both electrodes are shown as being transparent. Electrode 52 is made up of a photoconductive insulating material layer 53 overlying a conductive substrate which in this instance is shown as a substantially transparent conductive layer 51 deposited on a substantially transparent support member 55. Electrode 54 is shown as a substantially transparent conductive layer 56 deposited on substantially transparent substrate 57.

When it is desired to view the electro-optic cell using transmitted light it is preferred that both electrodes be substantially transparent. Of course in this instance there is required a photoconductive insulating material layer which is substantially transparent to the viewing electromagnetic radiation. Typical suitable substantially transparent photoconductive materials include, for example, relatively thin, e.g. about 5 microns, layers of selenium. However the electro-optic imaging cell may also be viewed using reflected light thereby requiring only a single transparent electrode while the other may be opaque. In this instance one of the electrodes is preferably made up of an opaque photoconductive insulating layer deposited on an opaque substrate which may be any suitable conducting material such as a metallic layer.

The transparent electrodes are separated by spacing member 13 which contains voids which form one or more shallow cups which contain the liquid crystalline film or layer 14. The electrodes are connected to opposite terminals of an external circuit 60 which typically comprises a source of potential 62 which is connected across the two electrodes through leads 64. When a potential is applied to the conducting surface 54 of electrode 52 in the dark no current will flow and no field will be established across the liquid crystal film since layer 53 is insulating under these conditions. However when the imaging cell is exposed to an imagewise pattern of activating radiation, the light-struck areas of photoconductive insulating layer 53 become conductive causing current to flow and establishing a field across the liquid crystal film in the light-struck areas. It is theorized that the current flow associated with the electric field causes the optical properties of the liquid crystalline material to change and the liquid crystal film which, in the Grandjean texture is substantially transparent prior to the application of the field, becomes "milky", i.e. focal-conic and scattering thereby effecting imaging. When the imaging cell is viewed by reflected light the image will typically appear as milky-white image areas on a dark background. When the imaging cell is viewed using transmitted light the image will typically appear as dark image areas with transparent non-image or background areas.

It should be recognized that other imaging device embodiments can be used in accordance with the method of the invention. For example, the development of an electrostatic latent image can be effected by bringing an electrostatic latent image bearing surface in close proximity or intimate contact with a film of the liquid crystalline material. The electrostatic latent image bearing surface may be any substantially insulating surface which is capable of supporting an electrostatic latent image and may be a photoconductive insulating material. The electrostatic latent image may be formed on the image bearing surface by any of a variety of means which are well known to those skilled in the art. Additionally the electrostatic latent image can be created on the image bearing surface before the latter is brought into proximity with the liquid crystalline imaging layer; however in certain embodiments it is also possible to create the electrostatic latent image on the image bearing surface while the latter is in close proximity with the liquid crystalline imaging layer.

The invention will now be further described in detail with respect to specific preferred embodiments thereof by way of examples it being understood that these are intended to be illustrative only and the invention is not limited to the materials, procedures, etc. recited therein. All parts and percentages are by weight unless otherwise indicated.

EXAMPLE I

A liquid crystalline composition comprising about 10 percent of racemic menthol (an optically inactive species) and about 90 percent of p-ethoxybenzylidene-p'-n-butylaniline is prepared and observed under a Leitz Dialux polarizing microscope. The composition exhibits typically nematic textures.

Another liquid crystalline composition is prepared by mixing together about 10 percent of 1-menthol (an optically active species) and about 90 percent of p-ethoxybenzylidene-p'-n-butylaniline. The composition is observed under the polarizing microscope and is seen to be strongly optically active when sheared, a characteristic of cholesteric liquid crystalline materials in the Grandjean texture.

The optical response of both of the liquid crystalline compositions to electrical fields is then observed in the following manner. A layer of the liquid crystalline material is disposed between two transparent NESA glass electrodes separated by a 2 mil thick Mylar spacer. The intensity of the light transmitted through the cell is monitored as a function of time with a silicon photodiode, mounted on a polarizing microscope, and a Brush recorder. A tungsten light source is used. The cell initially appears transparent.

A D.C. electric field of about $10^4$ V/cm is applied across the liquid crystalline film for about 5 minutes.

For the composition containing the optically inactive racemic menthol light-scattering is observed when the field is applied across the liquid crystalline film and ceases when the field is removed. The cell is observed to return to its initial transparent state in about 200 milliseconds.

Figure 5:
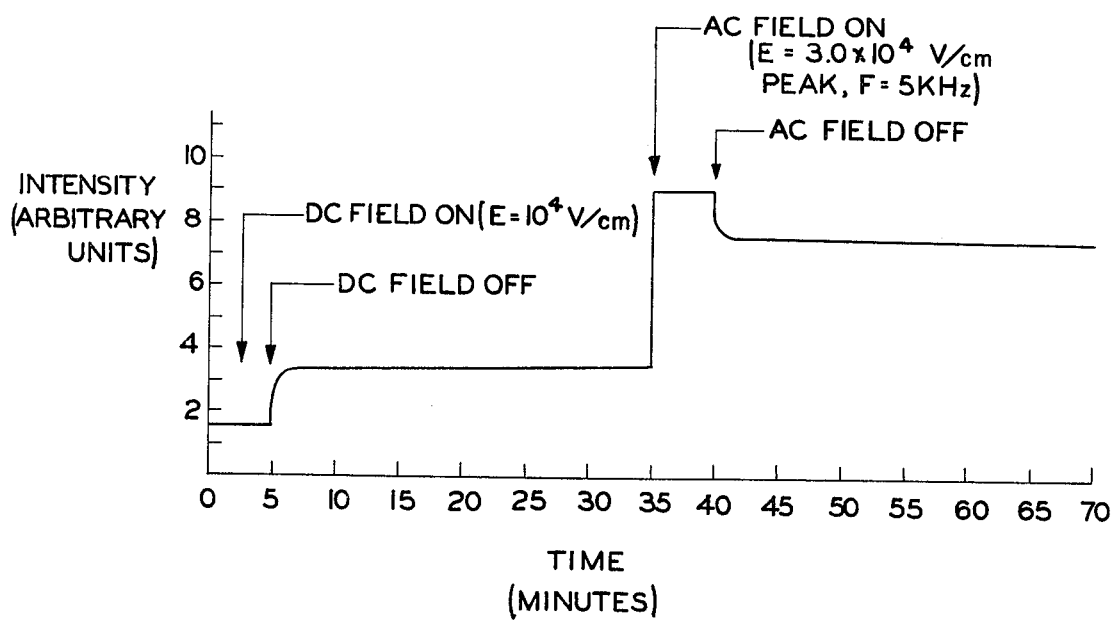
FIG. 5 is a graphical illustration of the optical response to electrical fields of a typical imaging composition used in the present invention.

However, the behavior of the composition containing the optically active 1-menthol contrasts sharply with that described above. For the composition containing 1-menthol the light scattering is observed to persist for about 6 hours. The intensity of the light transmitted through the cell for 30 minutes after field removal is plotted as a function of time and shown in FIG. 5. Referring to FIG. 5 it can be seen that after an initial relaxation, the intensity of the transmitted light increases very slowly in time. The pattern observable under the microscope is identifiable as a cholesteric focal-conic texture.

After about 35 minutes an A.C. electrical field of about $3.0 \times 10^4$ V/cm is applied across the liquid crystalline for about 5 minutes. it can be seen from FIG. 5 that the application of the A.C. field clears the cell, i.e. returns the liquid crystalline imaging material to its transparent state.

The time required to produce scattering or erasure is typically shorter than about 1 second. The 5 minute period is selected for measurement purposes only.

EXAMPLE II

A liquid crystalline composition comprising about 5 percent of 1-menthol and about 95 percent of p-ethoxybenzylidene-p'-n-butylaniline is prepared and observed in the same manner described in Example I. The composition is observed to be strongly optically active when sheared and the optical response of the composition to electrical fields is observed to be similar to that shown in FIG. 5.

EXAMPLE III

A liquid crystalline composition comprising about 5 percent of d-camphor (an optically active species) and about 95 percent of p-ethoxybenzylidene-p'-n-butylaniline is prepared and observed in the same manner described in Example I. The composition is observed to be strongly optically active when sheared. The optical response of the composition to electrical fields is found to be similar to that shown in FIG. 5.

EXAMPLE IV

A liquid crystalline composition comprising about 10 percent of d-camphor and about 90 percent of p-ethoxybenzylidene-p-n-butylaniline is prepared and observed in the same manner described in Example I. Again the composition is seen to be strongly optically active when sheared and the optical response characteristics thereof are found to be similar to those illustrated in FIG. 5.

While the invention has been described in detail with respect to various preferred embodiments thereof it is not intended to be limited thereto but rather it will be appreciated by those skilled in the art that modifications and variations are possible which are within the spirit of the invention and the scope of the claims.

What is claimed is:
1. An imaging method comprising
   a. providing a layer of a liquid crystalline composition having the optical properties of the cholesteric liquid crystalline mesophase, said composition comprising at least one nematic liquid crystalline substance and at least one optically active non-mesomorphic material, said optically active non-mesomorphic material not being cholesterol or a derivative of cholesterol and said liquid crystalline composition being in its predominantly Grandjean texture state;

b. applying an imagewise electrical field across said liquid crystalline layer within the Grandjean to focal-conic transition electrical field strength range of said liquid crystalline composition to cause said liquid crystalline composition to assume its focal-conic texture state substantially uniformly throughout the portion of the liquid crystalline composition to which the electrical field is applied thereby forming a substantially permanent image in said liquid crystalline layer; and c. removing said electrical field from said liquid crystalline layer whereby said substantially permanent image remains therein.

2. The method as defined in claim 1 further including the step of erasing said substantially permanent image in said liquid crystalline layer.

3. The method as defined in claim 2 and further including repeating the method steps at least one additional time.

4. The method as defined in claim 2 wherein said step of erasing said substantially permanent image comprises applying a uniform electric field across said liquid crystalline layer.

5. The method as defined in claim 4 wherein said electric field is an A.C. electric field.

6. The method as defined in claim 1 wherein said layer of liquid crystalline composition is provided in image configuration and arranged between a pair of electrodes, at least one of which is substantially transparent.

7. The method as defined in claim 1 wherein said layer of liquid crystalline composition is provided between a pair of electrodes at least one of which is shaped in the desired image configuration and at least one of which is substantially transparent.

8. The method as defined in claim 1 wherein the imagewise electrical field across said layer of liquid crystalline composition is created by an electrostatic latent image on an electrostatic latent image support surface in close proximity to the liquid crystalline layer.

9. The method as defined in claim 8 wherein the electrostatic latent image support surface is a photoconductive insulating layer.

10. The method as defined in claim 1 wherein said layer of liquid crystalline composition is provided between a pair of electrodes at least one of which is substantially transparent and at least one of which includes a photoconductive surface and said imagewise electrical field is created by applying a potential to said electrodes and exposing said photoconductive surface to an imagewise pattern of activating electromagnetic radiation.

11. The method as defined in claim 1 wherein said layer of liquid crystalline composition is arranged between first and second spaced plates, at least one of which is substantially transparent, each said first and second plates having a plurality of parallel electrically conductive films on one face thereof, the plurality of conductive films on at least one plate being substantially transparent, said two plates being positioned with said faces bearing said parallel conductive films adjacent and parallel to each other and the direction of said conductive films on one plate being perpendicular to the direction of said conductive films on the other plate.

12. The method as defined in claim 1 wherein said optically active non-mesomorphic material comprises from about 2 to about 60 percent by weight of said liquid crystalline composition.

13. The method as defined in claim 1 and further including viewing said layer of liquid crystalline composition with image enhancement means in transmitted light.

14. The method as defined in claim 1 and further including viewing said layer of liquid crystalline composition between polarizers in transmitted light.

15. An imaging method comprising a. providing a layer of a liquid crystalline composition having the optical properties of the cholesteric liquid crystalline mesophase, said composition comprising at least one nematic liquid crystalline substance and at least one optically active non-mesomorphic material, said optically active non-mesomorphic material not being cholesterol or a derivative of cholesterol and said liquid crystalline composition being in its predominantly grandjean texture state;

b. applying a uniform electrical field across said liquid crystalline layer within the grandjean to focal-conic texture transition electrical field strength range of said liquid crystalline composition to cause said liquid crystalline composition to assume its focal-conic texture state substantially uniformly throughout said liquid crystalline layer;

c. applying an imagewise electric field across said liquid crystalline layer to cause said liquid crystalline composition to assume its grandjean texture state substantially uniformly throughout the portion of the liquid crystalline composition to which the electric field is applied thereby forming a substantially permanent image in said layer; and d. removing said electrical field from said liquid crystalline layer whereby said substantially permanent image remains therein.

16. The method as defined in claim 15 wherein the electric field recited in step c is an A.C. electric field.

17. The method as defined in claim 16 and further including the step of erasing said substantially permanent image in said liquid crystalline layer.

18. The method as defined in claim 15 wherein said layer of liquid crystalline composition is provided between a pair of electrodes at least one of which is substantially transparent.

19. The method as defined in claim 15 and further including viewing said layer of liquid crystalline composition with image enhancement means in transmitted light.

20. The method as defined in claim 15 wherein said optically active non-mesomorphic material comprises from about 2 to about 60 percent by weight of said liquid crystalline composition.

21. An imaging method comprising a. providing a layer of a liquid crystalline composition having the optical properties of the cholesteric liquid crystalline mesophase, said composition comprising at least one nematic liquid crystalline substance and at least one optically active non-mesomorphic material, said optically active non-mesomorphic material not being cholesterol or a derivative of cholesterol and said liquid crystalline composition being in its predominantly grandjean texture state;

b. applying a uniform electrical field across said liquid crystalline layer within the grandjean to focal-conic transition electrical field strength range of said liquid crystalline composition to cause said liquid crystalline composition to assume its focal-conic texture state substantially uniformly throughout said layer, wherein said layer becomes light-scattering; and c. removing said electrical field from said liquid crystal layer whereby said layer remains light scattering.

22. The method as defined in claim 21 and further including the step $d$ of applying an electrical field across said liquid crystal layer to cause said liquid crystalline composition to assume its grandjean texture state substantially uniformly throughout said layer.

23. The method as defined in claim 22 wherein the electrical field recited in step $d$ is an A.C. electrical field.

24. The method as defined in claim 21 wherein said liquid crystalline layer is provided between a pair of electrodes at least one of which is substantially transparent.

25. The method as defined in claim 21 wherein said optically active non-mesomorphic material comprises about 2 to about 60 percent by weight of said liquid crystalline composition.

* * * * *